UNITED STATES PATENT OFFICE.

ARNO BEHR, OF JERSEY CITY, NEW JERSEY, AND HENRY C. HUMPHREY, OF STAMFORD, CONNECTICUT, ASSIGNORS TO EDWARD E. QUIMBY, (TRUSTEE,) OF NEW YORK, N. Y.

IMPROVEMENT IN PROCESSES OF EXTRACTING OIL FROM THE RESIDUUM IN THE MANUFACTURE OF GLUCOSE.

Specification forming part of Letters Patent No. 220,116, dated September 30, 1879; application filed January 25, 1879.

*To all whom it may concern:*

Be it known that we, ARNO BEHR, of Jersey City, New Jersey, and HENRY C. HUMPHREY, of Stamford, Connecticut, have invented a new Process of Extracting Oil from Corn in Conjunction with the Manufacture of Glucose therefrom, of which the following is a specification.

The extraction of oil from corn has hitherto been attempted by subjecting broken or ground corn to the action of a solvent of vegetable fat. The action of such solvents so employed is impeded by the presence in the material treated of a large percentage of substances other than the fat sought to be extracted.

Our invention consists in first dissolving out of the corn the starchy and other soluble matter except the fat, and, having thus concentrated the fat in the residuum, in then subjecting the residuum to the action of a solvent of fat.

In conducting our process, the first step is to manufacture glucose by separating the starchy matter from the corn without separating the fat. This may be accomplished by several methods. For example, the ground corn may be mixed with twice its weight of water, and the mixture then poured into a boiling aqueous solution, preferably of oxalic or other organic acid containing not exceeding four per cent. of acid. In this solution the corn is boiled for, say, six or seven hours in an open vessel, until the starchy matter has been converted into glucose, dextrine, &c. When this is the case iodine ceases to give the solution a blue or violet color.

Instead of being mixed in an open vessel, the corn may be mixed with, say, four times its weight of water containing not exceeding two per cent. of, preferably, an organic acid, and this mixture may be boiled or digested in a closed tank under pressure. In conducting the boiling in a closed tank, care must be taken not to apply so high a temperature as to burn or injure the product. The completion of the digesting operation is indicated in this case by the iodine test, as before.

By either of these methods a solution is made which contains the greater part of the organic matter of the corn, but none of the fat, and upon the completion of the boiling operation the solution is filtered and treated in the ordinary manner to obtain the glucose, &c. The undissolved residuum is then washed and filtered, pressed, and dried.

By the use of acids, as above described, the starchy matter, sugar, &c., are dissolved out of the corn, and the fatty matter is left in the residuum.

The second step in our process consists in treating the residuum with some solvent of vegetable fat, preferably bisulphide of carbon, which dissolves the fat out of the residuum. This is easily accomplished by pouring the bisulphide of carbon or other solvent upon the residuum, and allowing it to run through the mass until it has taken up all the fatty matter therefrom. The fat solution is then submitted to distillation, by which means the bisulphide of carbon or other solvent is driven off in the form of vapor, and raw oil is left.

The residual product resulting from the first step of our process will be found to contain upward of twenty-five per cent. of fat. A portion of this fat may, if desired, be separated by pressure; but the mode of separation which we prefer is to subject the residuum to the action of a solvent of fat, as described.

What we claim as our invention, and desire to secure by Letters Patent of the United States, is—

In connection with the manufacture of glucose, the herein-described process of extracting fat from corn, which consists in first separating the starchy matter from the corn by means of acids which are not solvents of fat, thus leaving the fat in the grain, and then treating the undissolved residuum with bisulphide of carbon, or some other solvent of vegetable fat, for the purpose of dissolving the fat out of such residuum, the several steps of the process being conducted substantially in the manner and for the purposes herein set forth.

ARNO BEHR.
H. C. HUMPHREY.

Witnesses:
O. H. KRAUSE,
ALBERT MAERTENS.